(12) United States Patent
Li (10) Patent No.: US 8,414,202 B2
(45) Date of Patent: Apr. 9, 2013

(54) CAMERA PLATFORM LOCKING DEVICE (75) Inventor: Jie Li, Zhongshan (CN)

(73) Assignee: Zhongshan Sirui Photographic Equipment Industry Co., Ltd., Zhongshan (CN)

( * ) Notice: Subject to any disclaimer, the term of this patent is extended or adjusted under 35 U.S.C. 154(b) by 79 days.

(21) Appl. No.: 13/193,659

(22) Filed: Jul. 29, 2011

(65) Prior Publication Data

US 2012/0237196 A1   Sep. 20, 2012

(30) Foreign Application Priority Data

Mar. 14, 2011 (CN) ...................... 2011 2 0066213 U (51) Int. Cl.
*F16M 11/14* (2006.01)
*G03B 17/56* (2006.01)

(52) U.S. Cl.
USPC ............... 396/428; 248/187.1; 248/181.1

(58) Field of Classification Search ........... 248/187.1, 248/181.1–181.2, 288.51, 287.1; 396/428
See application file for complete search history.

(56) References Cited

U.S. PATENT DOCUMENTS

| | | | | |
|---|---|---|---|---|
| 3,402,613 A * | 9/1968 | Neusel et al. | ............... | 74/89.35 |
| 4,095,483 A * | 6/1978 | Sargeant | ............... | 74/502.1 |
| 4,886,230 A * | 12/1989 | Jones et al. | ............... | 248/170 |
| 4,974,802 A * | 12/1990 | Hendren | ............... | 248/181.1 |
| 5,072,907 A * | 12/1991 | Vogt | ............... | 248/181.1 |
| 5,806,821 A | 9/1998 | Phillips et al. | ............... | 248/288.51 |
| 6,352,228 B1 * | 3/2002 | Buerklin | ............... | 248/181.1 |
| 7,300,028 B2 * | 11/2007 | Vogt | ............... | 248/181.1 |
| 7,464,906 B2 * | 12/2008 | Temperato et al. | ............... | 248/181.1 |
| 8,021,060 B2 * | 9/2011 | Sudhana et al. | ............... | 396/428 |

FOREIGN PATENT DOCUMENTS

FR   2643440 A  *   8/1990

* cited by examiner

*Primary Examiner* — Clayton E Laballe
*Assistant Examiner* — Leon W Rhodes, Jr.
(74) *Attorney, Agent, or Firm* — Matthias Scholl P.C.; Matthias Scholl (57) ABSTRACT

A camera platform locking device, including a housing, for preventing the components from exiting; in the housing from the top down are configured: a sphere, for providing a support to the camera; a locking mechanism, arranged underneath the sphere, for working with the housing to lock the sphere inside the housing; a platform base, arranged underneath the locking mechanism, and fixedly connected to the housing, for providing a support to the locking mechanism. A camera platform locking device of this invention may allow two regulating assemblies to gain distinguished moving distances for achieving different regulation purposes when rotating each knob of the regulating assemblies with the same angle so as to improve the regulation performance of the locking device.

9 Claims, 4 Drawing Sheets

CAMERA PLATFORM LOCKING DEVICE

CROSS-REFERENCE TO RELATED APPLICATIONS

Pursuant to 35 U.S.C. §119 and the Paris Convention Treaty, this application claims the benefit of Chinese Patent Application No. 201120066213.6 filed Mar. 14, 2011, the contents of which are incorporated herein by reference.

BACKGROUND OF THE INVENTION

1. Field of the Invention

This invention relates to a photographic accessory, in particular, relates to a camera platform locking device.

2. Description of the Related Art

The current locking device for camera platform has a housing, a sphere for providing a support to the camera, and a locking mechanism arranged underneath the sphere. Ordinarily, the locking mechanism is a lifting assembly which works with the housing to lock the sphere by pushing the sphere upwardly, so as to prevent it from rotating. Chinese patent with publication No. CN201083949Y discloses a locking device for camera platform, from the top down comprising a sphere, a damping ring arranged underneath the sphere, and a transmission component, wherein, the transmission component has a inclined bottom surface, and a locking mechanism underneath the transmission component; the locking mechanism comprises a primary regulating assembly, and the primary regulating assembly further comprises a primary screw bolt, and a primary knob configured at the end of the primary screw bolt and arranged outside the housing; the secondary regulating assembly for fine regulation comprises a secondary knob configured at the other end of the primary screw bolt and arranged outside the housing, whose diameter is less than that of the primary knob. In the above design, the effects of regulation through primary knob and secondary knob can not be obviously distinguished, because the primary assembly and the secondary assembly share the same screw bolt and achieve the regulation through the same screw thread and the same moving distance may be achieved as the knobs rotate the same angle.

SUMMARY OF THE INVENTION

This invention is to provide a camera platform locking device that may allow two regulating assemblies to gain distinguished moving distances for achieving different regulation purposes when rotating each knob of the regulating assemblies with the same angle so as to improve the regulation performance of the locking device.

The camera platform locking device of this invention, comprises:

a housing, for preventing the components from exiting;

in the housing from the top down are configured:

a sphere, for providing a support to the camera;

a locking mechanism, arranged underneath the sphere, for working with the housing to lock the sphere inside the housing;

a platform base, arranged underneath the locking mechanism, and fixedly connected to the housing, for providing a support to the locking mechanism;

the locking mechanism, comprises a primary regulating assembly for ordinary regulation and a secondary regulating assembly for fine regulation;

the primary regulating assembly comprises a primary screw bolt, and a primary knob configured at the end of the primary screw bolt and arranged outside the housing; the primary screw bolt has two screw threads that are reversely structured to each other; two primary driving components having inclined surfaces are in threaded connection with corresponding screw threads on the primary screw bolt; the inclined surfaces of the two primary driving components are oppositely arranged to each other, for driving the sphere to move up and down through their reverse movement; and the secondary regulating assembly comprises a secondary screw bolt, and a secondary knob arranged on the secondary screw bolt, which is also arranged outside the housing; the secondary screw bolt has a screw thread; further comprising a secondary driving component having a inclined surface is placed on the screw thread and is in threaded connection with it, for driving the sphere to move up and down through its relative movement to the sphere; the thread pitch of the secondary screw bolt is less than that of the primary screw bolt.

The locking device, wherein, the proportion between the thread pitch of the secondary screw bolt and the thread pitch of primary screw bolt is ⅓-⅔.

The locking device, wherein, the horizontal sextant angle formed by the connection line between the primary screw knob and the vertical housing axis and the connection line between the secondary screw knob and the vertical housing axis is 90 degree-160 degree.

The locking device, wherein an upper damping assembly is configured between the sphere and the housing for providing the damping for the upward and downward movement of the sphere; a lower damping assembly is configured between the sphere and the locking mechanism, the lower damping assembly has a inclined or spheric bottom surface, arranged underneath the sphere, for providing a damping to the upward and downward movement of the sphere; the primary driving components are connected to the inclined or spheric bottom surface of the lower damping assembly through their inclined surfaces, for driving the sphere to move up and down through their reverse movement; the secondary driving component is connected with the inclined or spheric bottom surface of the lower damping assembly through its inclined surface, for driving the sphere to move up and down through its relative movement to the lower damping assembly.

The locking device, wherein, the upper damping assembly is an upper damping ring, the lower damping assembly comprises a lower damping ring connected to the sphere, and a transmission component arranged underneath the lower damping ring and integrally connected with it, the transmission component has an inclined or spheric bottom.

The locking device, wherein, both the upper damping ring and the lower damping ring have a spheric surface for connecting with the sphere, the external diameter of the lower damping ring is the same as the internal diameter of the housing, and the lower damping ring is in movable connection with the internal wall of the housing, the upper damping ring and the lower damping ring is a plastic member, the transmission component is a metallic member.

The locking device, wherein, a secondary damping ring is arranged between the secondary knob and the housing, and is integrally connected to the secondary knob.

The locking device, wherein, the primary regulating assembly comprises a primary fixing component connected to the housing, for preventing the primary screw bolt from exiting; and the secondary regulating assembly comprises a secondary fixing component arranged between the secondary damping ring and the housing, and connected to the housing, for preventing the secondary screw bolt from exiting.

The locking device, wherein, the platform base from the top down comprises a shim connected to the locking mechanism, a supporting ring connected to the shim, and a screw nut connected to the supporting ring.

Advantages of the invention comprise:

1. The locking mechanism, comprises a primary regulating assembly and a secondary regulating assembly, the primary regulating assembly comprises a primary screw bolt, and a primary knob configured at the end of the primary screw bolt and arranged outside the housing; the primary screw bolt has two screw threads that are reversely structured to each other; two primary driving components having inclined surfaces are in threaded connection with corresponding screw threads on the primary screw bolt; the inclined surfaces of the two primary driving components are oppositely arranged to each other, for driving the sphere to move up and down through their reverse movement; the secondary regulating assembly for fine regulation comprises a secondary screw bolt, and a secondary knob arranged on the secondary screw bolt, which is also arranged outside the housing; the secondary screw bolt has a screw thread; a secondary driving component having a inclined surface is placed on the screw thread and is in threaded connection with it, for driving the sphere to move up and down through its relative movement to the sphere; the thread pitch of the secondary screw bolt is less than that of the primary screw bolt. The above design may allow two regulating assemblies for different regulation purposes, such as ordinary regulation and fine regulation to gain obviously distinguished moving distance when rotating each knob of the regulating assemblies with the same angle so as to improve the regulation performance of the locking device.

2. That the proportion between the thread pitch of the secondary screw bolt and the thread pitch of primary screw bolt is ⅓-⅔ may not only keep the movement of sphere at a relatively high speed, but also allow the secondary regulating assembly gains a high regulation accuracy, so as to guarantee the sphere can be situated at a relatively precise position required by the user.

3. That the horizontal sextant angle formed by the connection line between the primary screw knob and the vertical housing axis and the connection line between the secondary screw knob and the vertical housing axis is 90 degree-160 degree, may prevent the legs of camera from being blocked by the primary screw knob or secondary screw bolt when folding the legs of camera platform towards the platform locking device, in order to save the room occupied by the whole camera platform equipment.

4. An upper damping assembly is configured between the sphere and the housing for providing the damping for the upward and downward movement of the sphere; the lower damping assembly has a inclined or spheric bottom surface, the primary driving components are connected to the inclined or spheric bottom surface of the lower damping assembly through their inclined surfaces, for driving the sphere to move up and down through their reverse movement; the secondary driving component is connected with inclined or spheric bottom surface of the lower damping assembly through its inclined surface, for driving the sphere to move up and down through its relative movement to the lower damping assembly. This design may realize the upward and downward movement of the sphere through the horizontal movement of the driving components, and this not only improves the regulation accuracy, but also reduce the height of the locking mechanism in addition to the room occupied by the locking mechanism, so as to reduce the size of the camera platform locking device.

5. The upper damping assembly is an upper damping ring, the lower damping assembly comprises a lower damping ring connected to the sphere, and a transmission component arranged underneath the lower damping ring and integrally connected with it, the transmission component has an inclined or spheric bottom. This design allows the simultaneous movement of the lower damping ring and the transmission component integrally connected to the lower damping ring as one body, so as to lower the balance point of the new body integrally formed by the lower damping ring and the transmission component, and further facilitate the balance regulation of the lower damping assembly.

6. Both the upper damping ring and the lower damping ring have a spheric surface for connecting with the sphere, the external diameter of the lower damping ring is the same as the internal diameter of the housing, and the lower damping ring is in movable connection with the internal wall of the housing, and this may guarantee the stability of the sphere 3 when the sphere 3 moves up and down in the housing 1. The upper damping ring and the lower damping ring is a plastic member, the transmission component is a metallic member. In this design, a plastic member used as the lower damping assembly can prevent the surface of sphere from being abraded rather than a metallic component. A metallic member used as a transmission component may provide a good force transmission, so as to guarantee the regulation performance.

7. The secondary damping ring arranged between the secondary knob and the housing and integrally connected to the secondary knob, may improve fine regulation accuracy of the secondary regulating assembly.

8. The primary fixing component configured between the primary knob and the housing and connected to the housing, and the secondary fixing component arranged between the secondary damping ring and the housing, and connected to the housing, may prevent the primary and secondary screw bolt from exiting.

BRIEF DESCRIPTION OF THE DRAWING

Detailed description will be given below in conjunction with accompanying drawings.

In the drawings, the following reference numbers are used:

1—housing, 2—upper damping ring, 3—sphere, 4—lower damping ring, 5—transmission component, 6—primary screw bolt, 7 and 8—primary driving component, 9—shim, 10—supporting ring, 11—screw nut, 12—primary knob, 13—secondary knob, 14—secondary fixing component, 15—secondary screw bolt, 16—secondary driving component, 17—primary fixing component; 18—platform base.

DETAILED DESCRIPTION OF THE EMBODIMENTS

Example 1

Figure 1:
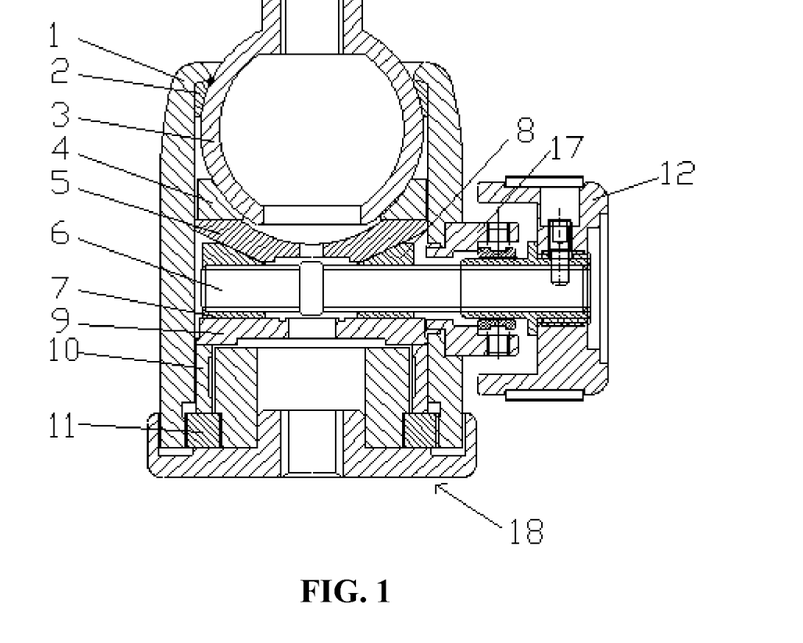
FIG. 1 is a sectional view of the camera platform locking device at the primary knob.
Figure 2:
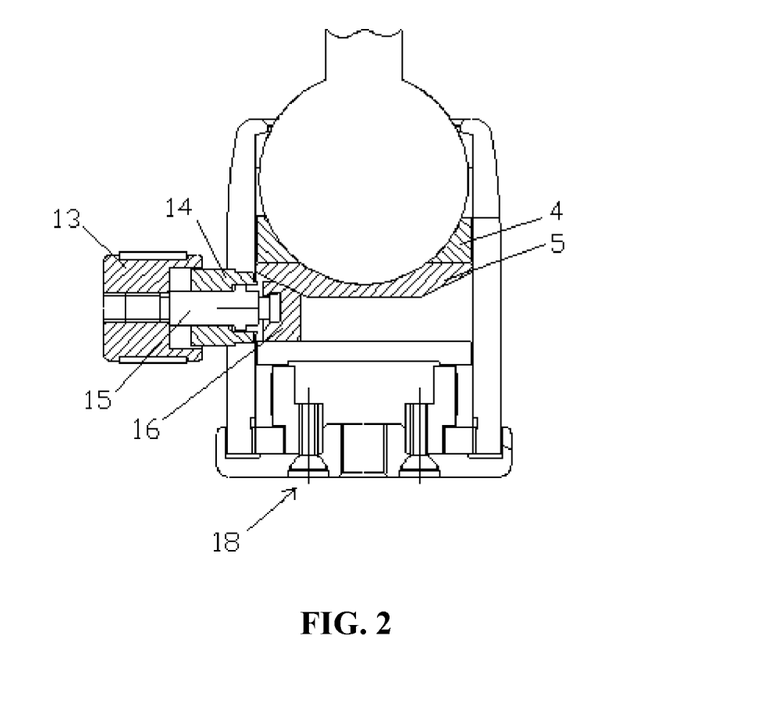
FIG. 2 is another sectional view of the camera platform locking device showing both primary knob and secondary knob.

Referring to FIG. 1 and FIG. 2, the camera platform locking device, comprises:
a housing 1, for preventing the components from exiting;
in the housing 1 from the top down are configured:
a sphere 3, for providing a support to the camera;
a lower damping assembly having a inclined or spheric bottom surface is arranged underneath the sphere 3, for providing a damping to the upward and downward movement of the sphere 3; a locking mechanism, arranged underneath the sphere 3, for working with the housing 1 to lock the sphere 3 inside the housing 1;
a platform base 18, arranged underneath the locking mechanism, and fixedly connected to the housing 1, for providing a support to the locking mechanism;
the locking mechanism, comprises a primary regulating assembly for ordinary regulation and a secondary regulating assembly for fine regulation, the primary regulating assembly comprises a primary screw bolt 6, and a primary knob 12 configured at the end of the primary screw bolt 6 and arranged outside the housing 1; the primary screw bolt 6 has two screw threads that are reversely structured to each other; two primary driving components 7 and 8 having inclined surfaces are in threaded connection with corresponding screw threads on the primary screw bolt 6; the inclined surfaces of the two primary driving components 7 and 8 are oppositely arranged to each other, and the primary driving components 7 and 8 are connected to the inclined or spheric bottom surface of the lower damping assembly through their inclined surfaces, for driving the sphere 3 to move up and down through their reverse movement; the secondary regulating assembly comprises a secondary screw bolt 15, and a secondary knob 13 arranged on the secondary screw bolt 15, which is also arranged outside the housing 1; the secondary screw bolt 15 has a screw thread; a secondary driving component 16 having a inclined surface is placed on the screw thread and is in threaded connection with it; the secondary driving component 16 is connected with the surface of the sphere through its inclined surface, for driving the sphere 3 to move up and down through its relative movement to the lower damping assembly; the thread pitch of the secondary screw bolt 15 is less than that of the primary screw bolt 6. The above design may allow two regulating assemblies for different regulation purposes, such as ordinary regulation and fine regulation to gain obviously distinguished moving distance when rotating each knob of the regulating assemblies with the same angle, so as to improve the regulation performance of the locking device.

The proportion between the thread pitch of the secondary screw bolt and the thread pitch of primary screw bolt is ⅔. This design may not only keep the movement of sphere at a relatively high speed, but also allow the secondary regulating assembly gains a high regulation accuracy, so as to guarantee the sphere can be situated at a relatively precise position required by the user.

An upper damping assembly is configured between the sphere 3 and the housing 1 for providing the damping for the upward and downward movement of the sphere 3; This design may realize the upward and downward movement of the sphere 3 through the horizontal movement of the driving components, and this not only improves the regulation accuracy, but also reduce the height of the locking mechanism in addition to the room occupied by the locking mechanism, so as to reduce the size of the camera platform locking device.

Figure 3:
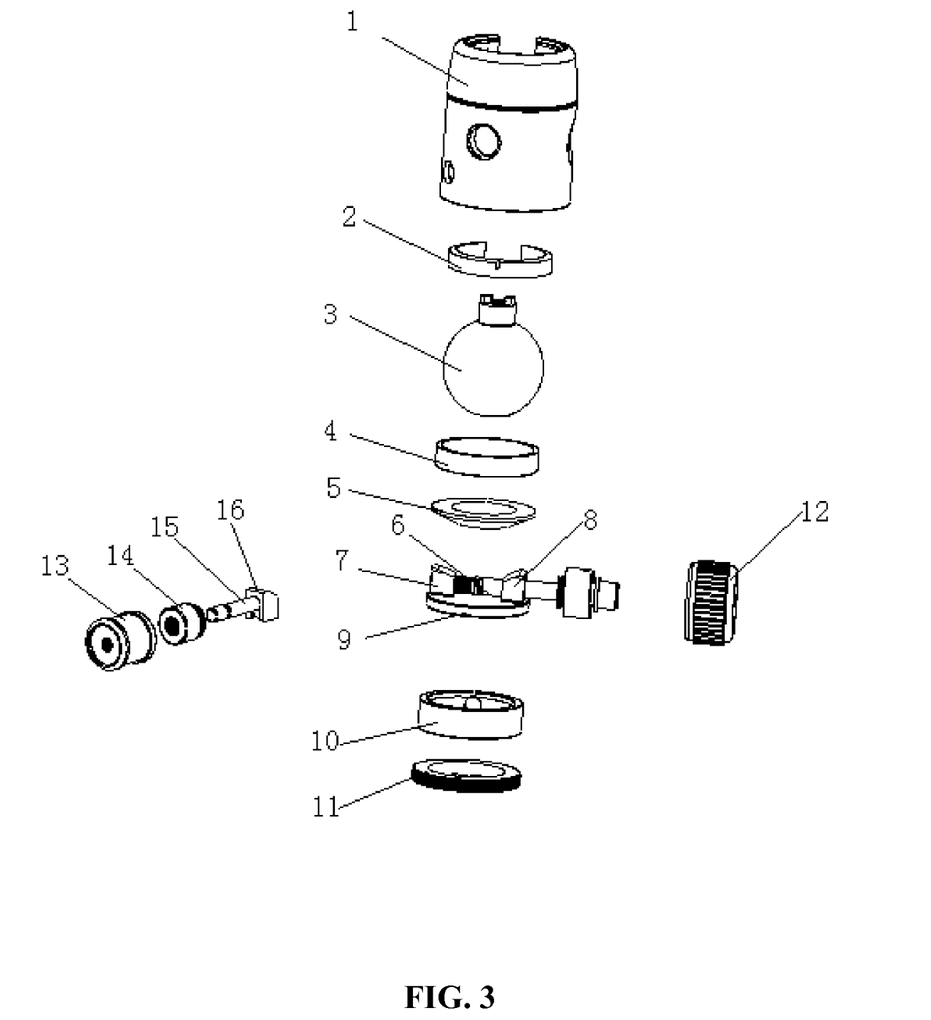
FIG. 3 illustrates all the components of the camera locking device.

Referring to FIG. 3, The upper damping assembly is an upper damping ring 2, the lower damping assembly comprises a lower damping ring 4 connected to the sphere 3, and a transmission component 5 arranged underneath the lower damping ring 4 and integrally connected with it, the transmission component 5 has an inclined or spheric bottom. This design allows the simultaneous movement of the lower damping ring 4 and the transmission component 5 integrally connected to the lower damping ring 4 as one body, so as to lower the balance point of the new body integrally formed by the lower damping ring 4 and the transmission component 5, and further facilitate the balance regulation of the lower damping assembly.

Both the upper damping ring 2 and the lower damping ring 4 have a spheric surface for connecting with the sphere 3, the external diameter of the lower damping ring 4 is the same as the internal diameter of the housing 1, and the lower damping ring 4 is in movable connection with the internal wall of the housing 1, so as to make sure that the sphere always moves along the vertical axis in the housing and does not sway; the upper damping ring 2 and the lower damping ring 4 is a plastic member, the transmission component 5 is a metallic member. In this design, a plastic member used as the lower damping assembly can prevent the surface of sphere 3 from being abraded rather than a metallic component. A metallic member used as a transmission component may provide a good force transmission, so as to guarantee the regulation performance.

The primary fixing component 17 is connected to the housing 1, for preventing the primary screw bolt from exiting, and the secondary fixing component 14 is connected to the housing 1, for preventing the secondary screw bolt 15 from exiting from the housing.

The platform base 18 from the top down comprises a shim 9 connected to the locking mechanism (not illustrated), a supporting ring 10 connected to the shim 9, and a screw nut 11 connected to the supporting ring 10.

Example 2

Referring to FIG. 1 and FIG. 2, the camera platform locking device, comprises:
a housing 1, for preventing the components from exiting;
in the housing 1 from the top down are configured:
a sphere 3, for providing a support to the camera;
a lower damping assembly, having a inclined or spheric bottom surface, arranged underneath the sphere 3, for providing a damping to the upward and downward movement of the sphere 3;
a locking mechanism, arranged underneath the sphere 3, for working with the housing 1 to lock the sphere 3 inside the housing 1;
a platform base 18, arranged underneath the locking mechanism, and fixedly connected to the housing 1, for providing a support to the locking mechanism; the locking mechanism, comprises a primary regulating assembly for ordinary regulation and a secondary regulating assembly for fine regulation, the primary regulating assembly comprises a primary screw bolt 6, and a primary knob 12 configured at the end of the primary screw bolt 6 and arranged outside the housing 1; the primary screw bolt 6 has two screw threads that are reversely structured to each other; two primary driving components 7 and 8 having inclined surfaces are in threaded connection with corresponding screw threads on the primary screw bolt 6; the inclined surfaces of the two primary driving components 7 and 8 are oppositely arranged to each other, and the primary driving components 7 and 8 are connected to the inclined or spheric bottom surface of the lower damping assembly through their inclined surfaces, for driving the sphere 3 to move up and down through their reverse movement; the secondary regulating assembly comprises a secondary screw bolt 15, and a secondary knob 13 arranged on the secondary screw bolt 15, which is also arranged outside the housing 1; the secondary screw bolt 15 has a screw thread; a secondary driving component 16 having a inclined surface is placed on the screw thread and is in threaded connection with it; the secondary driving component 16 is connected with the inclined or spheric bottom surface of the lower damping assembly through its inclined surface, for driving the sphere 3 to move up and down through its relative movement to the sphere 3; the thread pitch of the secondary screw bolt 15 is less than that of the primary screw bolt 6. The above design may allow two regulating assemblies for different regulation purposes, such as ordinary regulation and fine regulation to gain obviously distinguished moving distance when rotating each knob of the regulating assemblies with the same angle so as to improve the regulation performance of the locking device. This design not only improves the regulation accuracy, but also reduce the height of the locking mechanism in addition to the room occupied by the locking mechanism, so as to reduce the size of the camera platform locking device.

The proportion between the thread pitch of the secondary screw bolt and the thread pitch of primary screw bolt is ½. This design may not only keep the movement of sphere at a relatively high speed, but also allow the secondary regulating assembly gains a high regulation accuracy, so as to guarantee the sphere can be situated at a relatively precise position required by the user.

Figure 4:
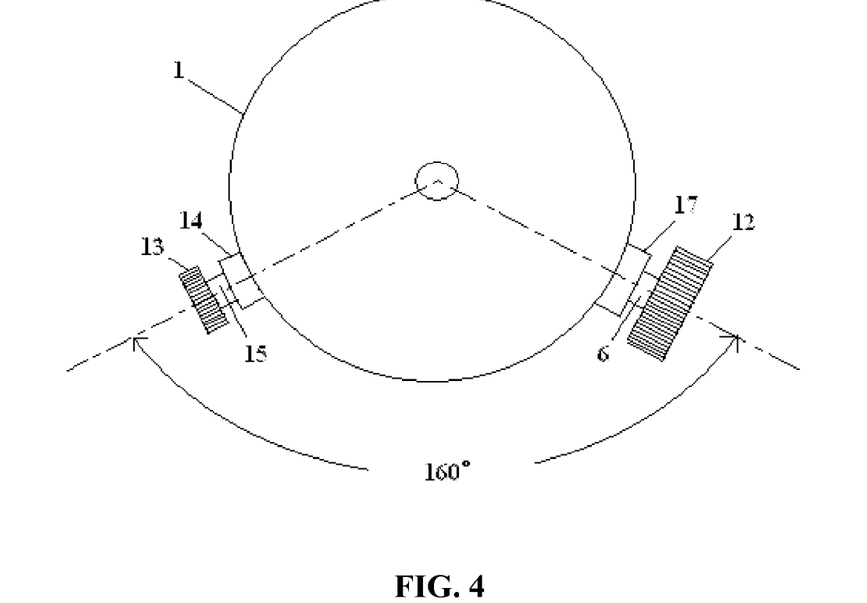
FIG. 4 illustrates a top view of the camera platform locking device with a 160 degree radian between primary knob and secondary knob.

Referring to FIG. 4, the horizontal sextant angle formed by the connection line between the primary screw knob and the vertical housing axis and the connection line between the secondary screw knob and the vertical housing axis, is 160 degree, and this may prevent the legs from being blocked by the primary screw knob or secondary screw bolt when the legs of camera platform are folded towards the platform locking device, in order to reduce the size of the camera platform equipment and save the room occupied by the folded camera platform equipment.

An upper damping assembly is configured between the sphere 3 and the housing 1 for providing the damping for the upward and downward movement of the sphere 3. This design may realize the upward and downward movement of the sphere 3 through the horizontal movement of the driving components.

Referring to FIG. 3, the upper damping assembly is an upper damping ring 2, the lower damping assembly comprises a lower damping ring 4 connected to the sphere 3, and a transmission component 5 arranged underneath the lower damping ring 4 and integrally connected with it, the transmission component 5 has an inclined or spheric bottom. This design allows the simultaneous movement of the lower damping ring 4 and the transmission component 5 integrally connected to the lower damping ring 4 as one body, so as to lower the balance point of the new body integrally formed by the lower damping ring 4 and the transmission component 5, and further facilitate the balance regulation of the lower damping assembly.

Both the upper damping ring 2 and the lower damping ring 4 have a spheric surface for connecting with the sphere 3, the external diameter of the lower damping ring 4 is the same as the internal diameter of the housing 1, and the lower damping ring 4 is in movable connection with the internal wall of the housing 1, and this may guarantee the stability of the sphere 3 when the sphere 3 moves up and down in the housing 1. The upper damping ring 2 and the lower damping ring 4 is a plastic member, the transmission component 5 is a metallic member. In this design, a plastic member used as the lower damping assembly can prevent the surface of sphere 3 from being abraded rather than a metallic component. A metallic member used as a transmission component may provide a good force transmission, so as to guarantee the regulation performance.

The primary fixing component 17 is connected to the housing 1, for preventing the primary screw bolt from exiting, and the secondary fixing component 14 is connected to the housing 1, for preventing the secondary screw bolt 15 from exiting.

The platform base 18 from the top down comprises a shim 9 connected to the locking mechanism (not illustrated), a supporting ring 10 connected to the shim 9, and a screw nut 11 connected to the supporting ring 10.

Example 3

Referring to FIG. 1 and FIG. 2, the camera platform locking device, comprises:

a cylindrical housing 1, for preventing the components from exiting;

in the housing 1 from the top down are configured:

a sphere 3, for providing a support to the camera;

a lower damping assembly having a inclined or spheric bottom surface, arranged underneath the sphere 3, for providing a damping to the upward and downward movement of the sphere 3;

a locking mechanism, arranged underneath the sphere 3, for working with the housing 1 to lock the sphere 3 inside the housing 1;

a platform base 18, arranged underneath the locking mechanism, and fixedly connected to the housing 1, for providing a support to the locking mechanism; the locking mechanism, comprises a primary regulating assembly for ordinary regulation and a secondary regulating assembly for fine regulation, the primary regulating assembly comprises a primary screw bolt 6, and a primary knob 12 configured at the end of the primary screw bolt 6 and arranged outside the housing 1; the primary screw bolt 6 has two screw threads that are reversely structured to each other; two primary driving components 7 and 8 having inclined surfaces are in threaded connection with corresponding screw threads on the primary screw bolt 6; the inclined surfaces of the two primary driving components 7 and 8 are oppositely arranged to each other, and the primary driving components 7 and 8 are connected to the inclined or spheric bottom surface of the lower damping assembly through their inclined surfaces, for driving the sphere 3 to move up and down through their reverse movement; the secondary regulating assembly comprises a secondary screw bolt 15, and a secondary knob 13 arranged on the secondary screw bolt 15, which is also arranged outside the housing 1; the secondary screw bolt 15 has a screw thread; a secondary driving component 16 having a inclined surface is placed on the screw thread and is in threaded connection with it; the secondary driving component 16 is connected with inclined or spheric bottom surface of the lower damping assembly through its inclined surface, for driving the sphere 3 to move up and down through its relative movement to the sphere 3; the thread pitch of the secondary screw bolt 15 is less than that of the primary screw bolt 6. The above design may allow two regulating assemblies for different regulation purposes, such as ordinary regulation and fine regulation to gain obviously distinguished moving distance when rotating each knob of the regulating assemblies with the same angle so as to improve the regulation performance of the locking device. This design not only improves the regulation accuracy, but also reduce the height of the locking mechanism in addition to the room occupied by the locking mechanism, so as to reduce the size of the camera platform locking device.

The proportion between the thread pitch of the secondary screw bolt and the thread pitch of primary screw bolt is ½. This design may not only keep the movement of sphere at a relatively high speed, but also allow the secondary regulating assembly gains a high regulation accuracy, so as to guarantee the sphere can be situated at a relatively precise position required by the user.

Figure 5:
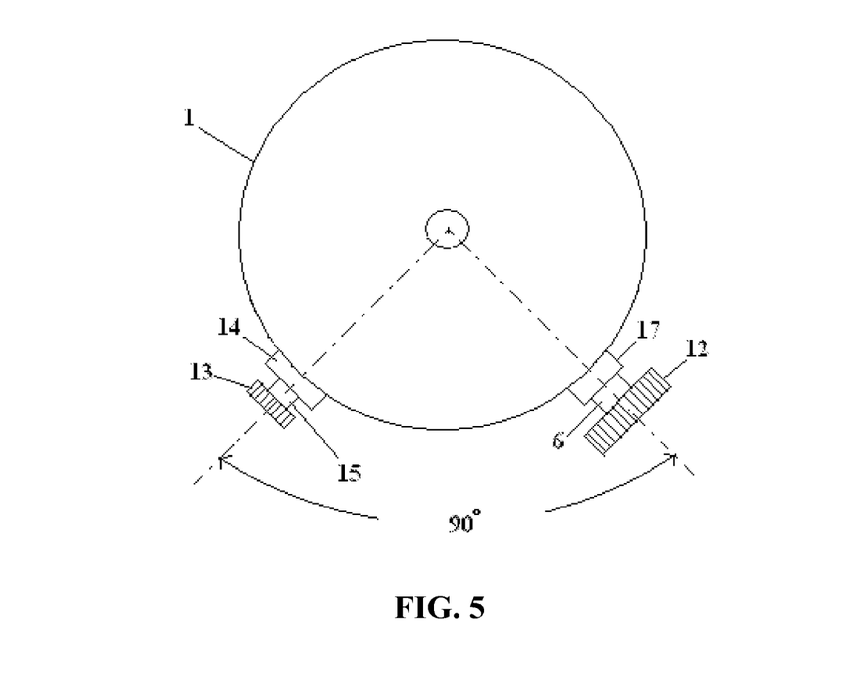
FIG. 5 is a top view of the camera platform locking device with a 90 degree radian between primary knob and secondary knob.

Referring to FIG. 5, the horizontal sextant angle formed by the connection line between the primary screw knob and the vertical housing axis and the connection line between the secondary screw knob and the vertical housing axis, is 90 degree, and this may prevent the legs of camera platform from being blocked by the primary screw knob or secondary screw bolt when the legs of camera platform are folded towards the platform locking device, in order to reduce the size of the camera platform equipment and save the room occupied by the folded camera platform equipment.

An upper damping assembly is configured between the sphere 3 and the housing 1 for providing the damping for the upward and downward movement of the sphere 3. This design may realize the upward and downward movement of the sphere 3 through the horizontal movement of the driving components.

Referring to FIG. 3, the upper damping assembly is an upper damping ring 2, the lower damping assembly comprises a lower damping ring 4 connected to the sphere 3, and a transmission component 5 arranged underneath the lower damping ring 4 and integrally connected with it, the transmission component 5 has an inclined or spheric bottom. This design allows the simultaneous movement of the lower damping ring 4 and the transmission component 5 integrally connected to the lower damping ring 4 as one body, so as to lower the balance point of the new body integrally formed by the lower damping ring 4 and the transmission component 5, and further facilitate the balance regulation of the lower damping assembly.

Both the upper damping ring 2 and the lower damping ring 4 have a spheric surface for connecting with the sphere 3, the external diameter of the lower damping ring 4 is the same as the internal diameter of the housing 1, and the lower damping ring 4 is in movable connection with the internal wall of the housing 1, and this may guarantee the stability of the sphere 3 when the sphere 3 moves up and down in the housing 1. The upper damping ring 2 and the lower damping ring 4 is a plastic member, the transmission component 5 is a metallic member. In this design, a plastic member used as the lower damping assembly can prevent the surface of sphere 3 from being abraded rather than a metallic component. A metallic member used as a transmission component may provide a good force transmission, so as to guarantee the regulation performance.

A secondary damping ring (not illustrated) is arranged between the secondary knob 13 and the housing, and is integrally connected to the secondary knob 13. This may improve fine regulation accuracy of the secondary regulating assembly.

The primary fixing component 17 is connected to the housing 1, for preventing the primary screw bolt from exiting, and the secondary fixing component 14 is arranged between the secondary damping ring (not illustrated) and the housing 1, and connected to the housing 1, for preventing the secondary screw bolt 15 from exiting.

The platform base 18 from the top down comprises a shim 9 connected to the locking mechanism (not illustrated), a supporting ring 10 connected to the shim 9, and a screw nut 11 connected to the supporting ring 10.

Example 4

Referring to FIG. 1 and FIG. 2, the camera platform locking device, comprises:
a cylindrical housing 1, for preventing the components from exiting;
in the housing 1 from the top down are configured:
a sphere 3, for providing a support to the camera;
a lower damping assembly having a inclined or spheric bottom surface, arranged underneath the sphere 3, for providing a damping to the upward and downward movement of the sphere 3;
a locking mechanism, arranged underneath the sphere 3, for working with the housing 1 to lock the sphere 3 inside the housing 1;
a platform base 18, arranged underneath the locking mechanism, and fixedly connected to the housing 1, for providing a support to the locking mechanism; the locking mechanism, comprises a primary regulating assembly for ordinary regulation and a secondary regulating assembly for fine regulation, the primary regulating assembly comprises a primary screw bolt 6, and a primary knob 12 configured at the end of the primary screw bolt 6 and arranged outside the housing 1; the primary screw bolt 6 has two screw threads that are reversely structured to each other; two primary driving components 7 and 8 having inclined surfaces are in threaded connection with corresponding screw threads on the primary screw bolt 6; the inclined surfaces of the two primary driving components 7 and 8 are oppositely arranged to each other, and the primary driving components 7 and 8 are connected to the inclined or spheric bottom surface of the lower damping assembly through their inclined surfaces, for driving the sphere 3 to move up and down through their reverse movement. The secondary regulating assembly comprises a secondary screw bolt 15, and a secondary knob 13 arranged on the secondary screw bolt 15, which is also arranged outside the housing 1; the secondary screw bolt 15 has a screw thread; a secondary driving component 16 having a inclined surface is placed on the screw thread and is in threaded connection with it; the secondary driving component 16 is connected with the inclined or spheric bottom surface of the lower damping assembly through its inclined surface, for driving the sphere 3 to move up and down through the relative movement to the lower damping assembly; the thread pitch of the secondary screw bolt 15 is less than that of the primary screw bolt 6. The above design may allow two regulating assemblies for different regulation purposes, such as ordinary regulation and fine regulation to gain obviously distinguished moving distance when rotating each knob of the regulating assemblies with the same angle so as to improve the regulation performance of the locking device. This design not only improves the regulation accuracy, but also reduce the height of the locking mechanism in addition to the room occupied by the locking mechanism, so as to reduce the size of the camera platform locking device.

The proportion between the thread pitch of the secondary screw bolt and the thread pitch of primary screw bolt is ⅓. This design may not only keep the movement of sphere at a relatively high speed, but also allow the secondary regulating assembly gains a high regulation accuracy, so as to guarantee the sphere can be situated at a relatively precise position required by the user.

Figure 6:
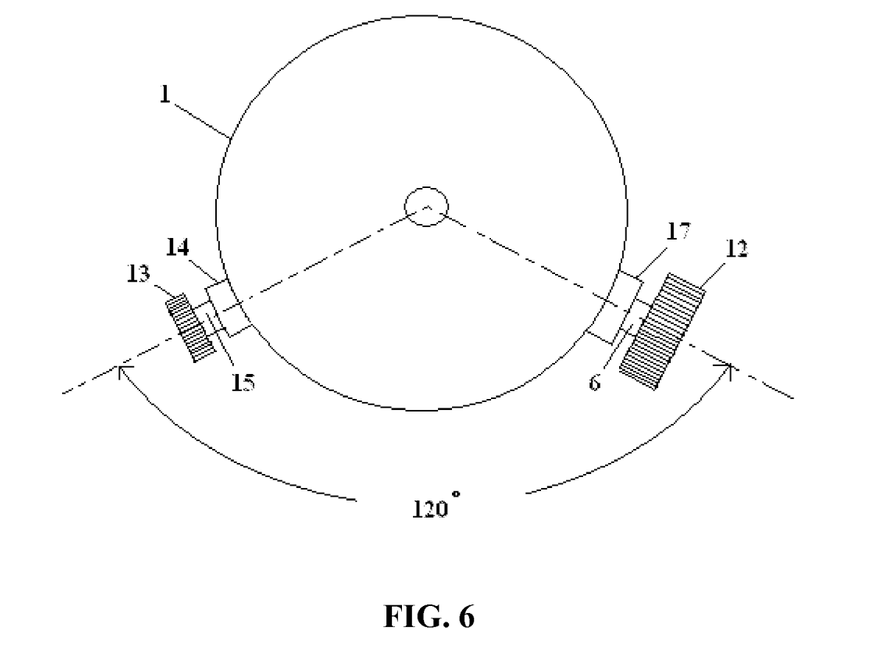
FIG. 6 is a top view of the camera platform locking device with a 120 degree radian between primary knob and secondary knob.

Referring to FIG. 6, the horizontal sextant angle formed by the connection line between the primary screw knob and the vertical housing axis and the connection line between the secondary screw knob and the vertical housing axis, is 120 degree, and this may prevent the legs of camera from being blocked by the primary screw knob or secondary screw bolt when the legs of camera platform are folded towards the platform locking device, in order to reduce the size of the camera platform equipment and save the room occupied by the folded camera platform equipment.

An upper damping assembly is configured between the sphere 3 and the housing 1 for providing the damping for the upward and downward movement of the sphere 3. This design may realize the upward and downward movement of the sphere 3 through the horizontal movement of the driving components.

Referring to FIG. 3, the upper damping assembly is an upper damping ring 2, the lower damping assembly comprises a lower damping ring 4 connected to the sphere 3, and a transmission component 5 arranged underneath the lower damping ring 4 and integrally connected with it, the transmission component 5 has an inclined or spheric bottom. This design allows the simultaneous movement of the lower damping ring 4 and the transmission component 5 integrally connected to the lower damping ring 4 as one body, so as to lower the balance point of the new body integrally formed by the lower damping ring 4 and the transmission component 5, and further facilitate the balance regulation of the lower damping assembly.

Both the upper damping ring 2 and the lower damping ring 4 have a spheric surface for connecting with the sphere 3, the external diameter of the lower damping ring 4 is the same as the internal diameter of the housing 1, and the lower damping ring 4 is in movable connection with the internal wall of the housing 1, and this may guarantee the stability of the sphere 3 when the sphere 3 moves up and down in the housing 1. The upper damping ring 2 and the lower damping ring 4 is a plastic member, the transmission component 5 is a metallic member. In this design, a plastic member used as the lower damping assembly can prevent the surface of sphere 3 from being abraded rather than a metallic component. A metallic member used as a transmission component may provide a good force transmission, so as to guarantee the regulation performance.

A secondary damping ring (not illustrated) is arranged between the secondary knob and the housing, and is integrally connected to the secondary knob. This may improve fine regulation accuracy of the secondary regulating assembly.

The primary fixing component 17 is connected to the housing 1, for preventing the primary screw bolt from exiting, and the secondary fixing component 14 is arranged between the secondary damping ring (not illustrated) and the housing 1, and connected to the housing 1, for preventing the secondary screw bolt 15 from exiting.

The platform base 18 from the top down comprises a shim 9 connected to the locking mechanism (not illustrated), a supporting ring 10 connected to the shim 9, and a screw nut 11 connected to the supporting ring 10.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A camera platform locking device, comprising:
a housing, for preventing the components from exiting; in said housing from the top down are configured:
a sphere, for providing a support to the camera;
a locking mechanism, arranged underneath said sphere, for working with said housing to lock said sphere inside the housing;
a platform base, arranged underneath said locking mechanism, and fixedly connected to the housing, for providing a support to said locking mechanism;
said locking mechanism, comprises a primary regulating assembly for ordinary regulation and a secondary regulating assembly for fine regulation, said primary regulating assembly comprises a primary screw bolt, and a primary knob configured at the end of the primary screw bolt and arranged outside the housing; said primary screw bolt has two screw threads that are reversely structured to each other; two primary driving components having inclined surfaces are in threaded connection with corresponding screw threads on the primary screw bolt; the inclined surfaces of the two primary driving components are oppositely arranged to each other, for driving the sphere to move up and down through their reverse movement; and
said secondary regulating assembly comprises a secondary screw bolt, and a secondary knob arranged on the secondary screw bolt, which is also arranged outside the housing; said secondary screw bolt has a screw thread; a secondary driving component having a inclined surface is placed on the screw thread and is in threaded connection with it, for driving the sphere to move up and down through its relative movement to the sphere; the thread pitch of the secondary screw bolt is less than that of the primary screw bolt.

2. The locking device of claim 1, wherein, the proportion between the thread pitch of the secondary screw bolt and the thread pitch of primary screw bolt is ⅓-⅔.

3. The locking device of claim 2, wherein, the horizontal sextant angle formed by the connection line between the primary screw knob and the vertical housing axis and the connection line between the secondary screw knob and the vertical housing axis is 90 degree-160 degree.

4. The locking device of claim 3, wherein an upper damping assembly is configured between the sphere and the housing for providing the damping for the upward and downward movement of the sphere; a lower damping assembly is configured between said sphere and said locking mechanism for providing a damping to the upward and downward movement of said sphere; said lower damping assembly has a inclined or spheric bottom surface, said primary driving components are connected to said inclined or spheric bottom surface of the lower damping assembly through their inclined surfaces, for driving the sphere to move up and down through their reverse movement; said secondary driving component is connected with said inclined or spheric bottom surface of the lower damping assembly through its inclined surface, for driving the sphere to move up and down through its relative movement to the lower damping assembly.

5. The locking device of claim 4, wherein, the upper damping assembly is an upper damping ring, said lower damping assembly comprises a lower damping ring connected to said sphere, and a transmission component arranged underneath said lower damping ring and integrally connected with it, said transmission component has an inclined or spheric bottom.

6. The locking device of claim 5, wherein, both said upper damping ring and said lower damping ring have a spheric surface for connecting with the sphere, the external diameter of said lower damping ring is the same as the internal diameter of said housing, and said lower damping ring is in movable connection with the internal wall of said housing, said upper damping ring and said lower damping ring is a plastic member, said transmission component is a metallic member.

7. The locking device of claim 6, wherein, a secondary damping ring is arranged between said secondary knob and said housing, and is integrally connected to said secondary knob.

8. The locking device of claim 7, wherein, said primary regulating assembly comprises a primary fixing component connected to said housing, for preventing said primary screw bolt from exiting; and said secondary regulating assembly comprises a secondary fixing component arranged between the secondary damping ring and the housing, and connected to said housing, for preventing said secondary screw bolt from exiting.

9. The locking device of claim 8, wherein, said platform base from the top down comprises a shim connected to said locking mechanism, a supporting ring connected to said shim, and a screw nut connected to said supporting ring.

* * * * *